United States Patent [19]
Easton

[11] Patent Number: 6,039,132
[45] Date of Patent: Mar. 21, 2000

[54] STEERING CONTROL SYSTEM FOR TRACKED VEHICLE

[75] Inventor: David Joseph Easton, Cedar Falls, Iowa

[73] Assignee: Deere & Company, Moline, Ill.

[21] Appl. No.: 09/053,600

[22] Filed: Apr. 1, 1998

[51] Int. Cl.[7] ............................................. B62D 11/02
[52] U.S. Cl. ............................................ 180/6.44; 701/41
[58] Field of Search ............................ 180/6.44, 6.54, 180/6.66, 6.7, 9.1, 9.44, 900; 701/41, 44

[56] References Cited

U.S. PATENT DOCUMENTS

| | | | |
|---|---|---|---|
| 4,862,366 | 8/1989 | Morishita et al. | 364/424.05 |
| 5,390,751 | 2/1995 | Puetz et al. | 180/6.48 |
| 5,406,860 | 4/1995 | Easton et al. | 74/335 |
| 5,473,541 | 12/1995 | Ishino et al. | 364/424.07 |
| 5,477,454 | 12/1995 | Ishino et al. | 364/424.07 |
| 5,477,455 | 12/1995 | Ishino et al. | 364/424.07 |
| 5,535,840 | 7/1996 | Ishino et al. | 180/6.44 |
| 5,563,790 | 10/1996 | Wada et al. | 364/424.05 |
| 5,611,405 | 3/1997 | Ishino et al. | 180/6.44 |
| 5,948,029 | 9/1999 | Straetker | 701/41 |

*Primary Examiner*—J. J. Swann
*Assistant Examiner*—Christopher D Bottorff

[57] ABSTRACT

A tracked vehicle includes an engine driven variable displacement steering pump which drives hydraulic steering motor. The steering motor drives a differential drive mechanism which drives left and right track drive wheels. A steering control system senses the position of a non-spring centered steering wheel, vehicle speed, engine speed, steering motor speed, whether or not the transmission is in gear or in neutral, and whether the clutch is engaged or disengaged. In order to prevent a self-perpetuating turn situation, the control system gradually decreases the steering motor speed if the transmission is in neutral or the clutch is not engaged, and the steering motor speed divided by the vehicle speed is greater than a threshold, and the vehicle speed is less than a reference level.

5 Claims, 2 Drawing Sheets

STEERING CONTROL SYSTEM FOR TRACKED VEHICLE

BACKGROUND OF THE INVENTION

The invention relates to a steering control system for a tracked vehicle.

Tracked vehicles are steered by driving one track faster or slower than the other. Most tracked vehicles with differential steering have a steering pump which is driven by the engine rather than by the ground, so that the vehicle can turned without forward or reverse translational vehicle motion, and so that a more reasonably sized pump can be used. On currently available tracked vehicles, such as the 8000T tractor manufactured by John Deere and on tracked vehicles manufactured by Caterpillar, the steering wheel is spring centered so that there will be no vehicle turning unless the operator intentionally commands the vehicle to turn by rotating the steering wheel away from its spring-centered position. Such a system is described in U.S. Pat. No. 5,948,029, issued Sep. 7, 1999 to Straetker, and assigned to the assignee of this application.

A non-spring-centered steering input device is described in pending U.S. patent application Ser. No. 08/991,961, filed Dec. 17, 1997 (Atty. Docket No. 14524-US), and assigned to the assignee of this application. This non-centered steering input device makes possible a steering function which performs similar to the steering function of a wheeled vehicle. A primary characteristic of a wheeled vehicle steering function is that rotation of the steering wheel commands a particular curvature of the vehicle's path, and the amount of curvature is largely independent of the engine speed, wheel speed, vehicle weight, or ground conditions. This characteristic is achieved for a tracked vehicle by sensing wheel speed and steering motor speed and controlling the relative speed of the tracks in proportion to the wheel speed. If the vehicle is moving quickly, the tracks have a large relative motion, and this relative motion is reduced as the vehicle slows down. When the vehicle stops forward or reverse longitudinal motion, track relative motion also stops. However, with such a steering input device, when the vehicle is performing a sharp turn and the transmission is disengaged, either by depressing the clutch or shifting to neutral, it is possible for tractor momentum to continue vehicle motion, or the steering motor may actually propel the vehicle through this sharp turn. The control system will sense the longitudinal motion of the vehicle and command the proper track relative motion to maintain the turn radius. However, when the track relative motion is the actual cause of the longitudinal motion, then it is possible for the vehicle to inadvertently continue turning until the operator intervenes—a self-perpetuating turn. It would be desirable to provide a steering control system which prevents or limits self-perpetuating turns.

SUMMARY OF THE INVENTION

Accordingly, an object of this invention is to provide, for a tracked vehicle steering system with a non-spring-centered steering input device, a steering control system which does not permit or which limits self-perpetuating turns.

These and other objects are achieved by the present invention, wherein a tracked vehicle includes a differential steer system utilizing one variable displacement pump and one fixed displacement motor with an electromechanical steering linkage and a non-spring centered steering wheel. A steering control system senses steering wheel position, vehicle speed, engine speed, steering motor speed, whether or not the transmission is in gear or in neutral, and whether the clutch is engaged or disengaged. An algorithm operates to gradually and repeatedly decrease the commanded steering motor speed if the transmission is in neutral or the clutch is not engaged, and the steering motor speed divided by the wheel speed is greater than a threshold, and the wheel speed is less than a certain fraction of the engine speed. Alternatively, an algorithm prevents increases in steering motor speed if a ratio of the steering motor speed to the vehicle speed is greater than a threshold.

DETAILED DESCRIPTION

Figure 1:
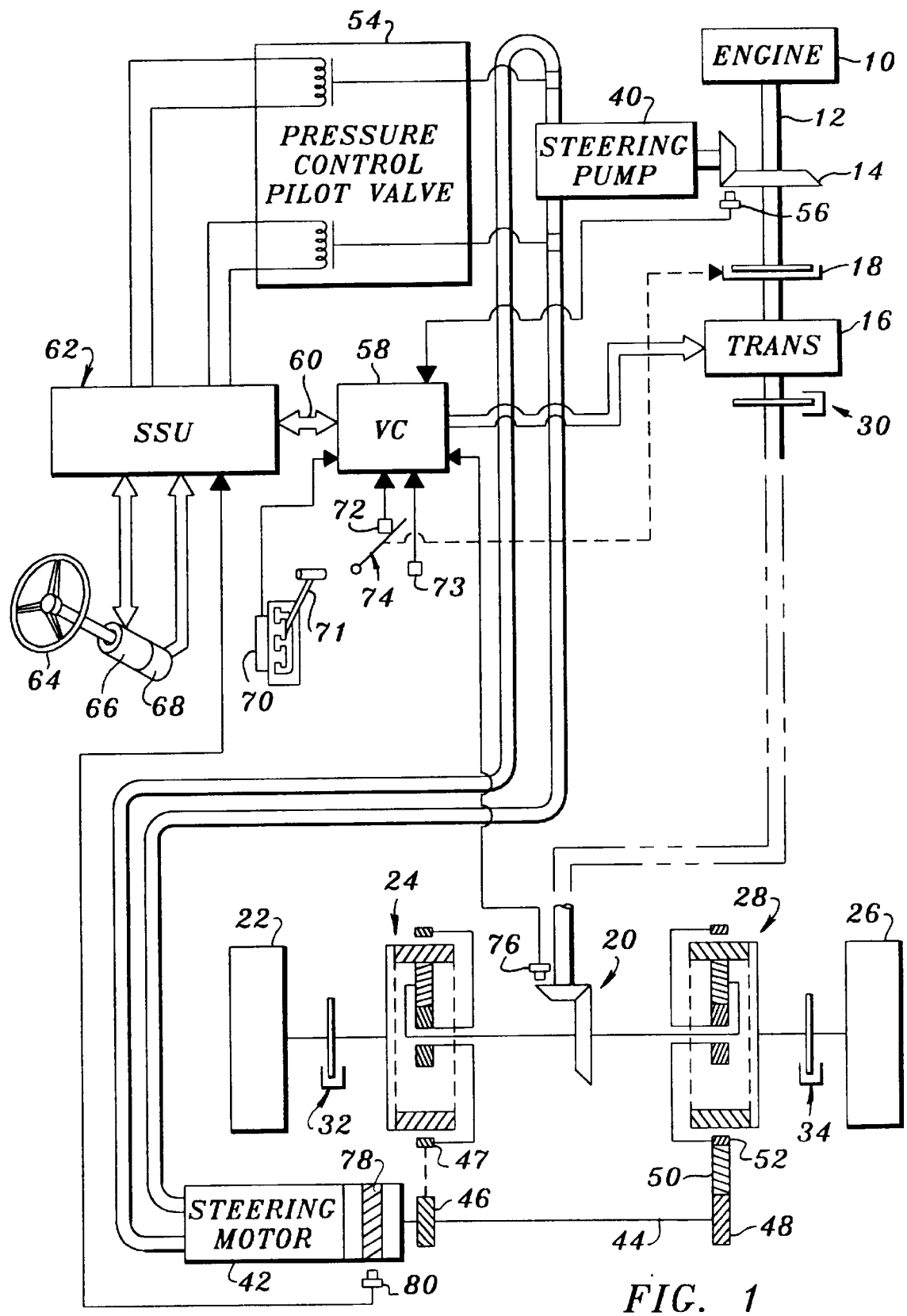
FIG. 1 is a simplified schematic diagram of a tracked vehicle drive and the control system of the present invention.

Referring to FIG. 1, a drive train of a tracked vehicle includes an engine 10 with an output shaft 12 which drives a right angle gear 14 and a transmission 16. The transmission 16 drives a clutch 18 which, in turn, drives, via right angle drive 20, a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 12, 1995 to Puetz et al., and assigned to the assignee of this application. Additional outboard planetaries (not shown), as provided on John Deere 8000T tractors, are mounted between the steering planetaries and the respective drive wheels, but are not further described because they are not involved in the steering control function which is the subject matter of this application. A parking brake 30 is coupled to the transmission output shaft, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 24.

The swashplate (not shown) of steering pump 40 is controlled by a pressure controlled pilot valve or electronic displacement control (EDC) 54. The EDC is preferably a known two stage device with first stage including a flapper type valve and a second stage including a boost stage to the pump, such as is used on the commercially available John Deere 8000T tracked tractor.

A rotation speed sensor 56, such as a commercially available magnetic pickup, mounted in proximity to the right angle drive 14, provides an engine speed signal to a vehicle controller VC 58, such as is used on the commercially available John Deere 8000T tracked tractor. The vehicle controller 58 controls the transmission 16 and other vehicle functions, and is connected via a bus 60 to a steering controller or steering system unit (SSU) 62. The solenoids of EDC 54 are controlled by pump command signals generated by SSU 62.

An operator controlled steering wheel 64 is preferably not spring centered, is capable of turning through an unlimited angular range, and is coupled to a variable friction feel steering input device 66, such as described in the aforementioned U.S. patent application Ser. No. 08/991,961, filed Dec. 17, 1997 (attorney's docket 14524-US), which is hereby incorporated by reference. The steering input device 66 preferably includes a transducer unit 68 which generates signals representing the changes in position of the steering wheel 64 for communication to the SSU 62. The transducer unit 68 preferably includes a pair of gear-driven rotary incremental encoders(not shown), such as a commercially available OakGrigsby 900 Optical Encoder or a Grayhill Series 61H encoder.

A transmission shift lever transducer 70, such as described in U.S. Pat. No. 5,406,860, issued Apr. 18, 1995 to Easton et al., provides commanded forward, neutral, reverse and commanded gear signals to a powershift transmission control unit (not shown) which is part of the vehicle controller VC 58 as a function of the position of a shift lever 71. Clutch switches 72 and 73 provide signals to the VC 58 (and to SSU 62 via bus 60) when the clutch pedal 74 is fully released and fully depressed, respectively.

A drive line rotation speed sensor 76, preferably a differential Hall-effect speed sensor such as used on production John Deere tractors, is mounted in proximity to the right angle drive 20, provides to the VC 58 (and to SSU 62 via bus 60) a final drive speed, vehicle or wheel speed signal (whl_spd). A magnetic ring 78 is mounted for rotation with the motor 42, and a Hall-effect transducer 80 mounted near the magnetic ring 78 provides to the SSU 62 a motor speed signal and a motor direction signal.

The SSU 62 includes a commercially available microprocessor (not shown) and controls the speed of the steering motor 42 as a function of various inputs, as described in the aforementioned U.S. patent application Ser. No. 08/795,091, filed Feb. 5, 1997 (attorney's docket 14644-US), which is hereby incorporated by reference. Except for the steering input device 66 and the algorithm illustrated in FIG. 2, the elements shown in FIG. 1 are similar to those used on the commercially available John Deere 8000T tracked tractor.

Figure 2:
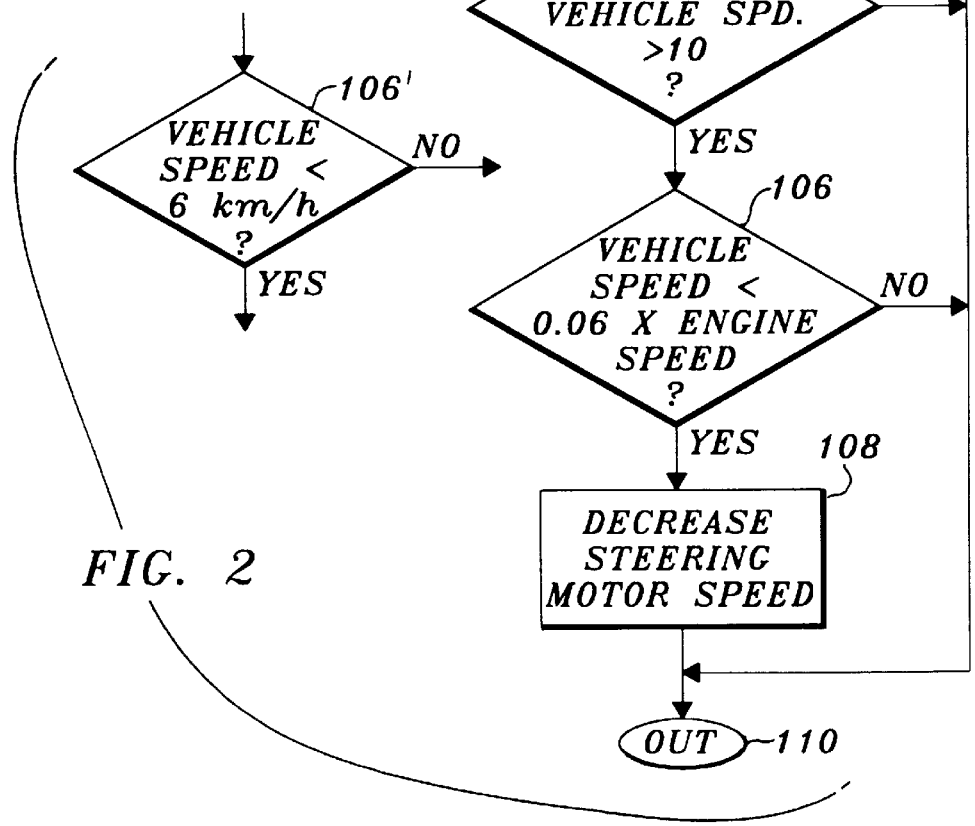
FIG. 2 is a logic flow diagram of an algorithm executed by the control system of FIG. 1.

According to the present invention, once every 20 milliseconds for example, the SSU 62 executes a main loop control program which calls or executes the algorithm or subroutine illustrated by FIG. 2. This subroutine begins at step 100. In step 102 the algorithm determines, from information provided from the VC 58 whether or not the transmission 16 is in neutral, and from signals provided by the clutch pedal switches 72 and 73, whether the clutch 18 is not engaged. If the transmission 16 is not in neutral and the clutch 18 is engaged, step 102 directs the algorithm to step 110 which returns control to the main loop. On the other hand, if the transmission 16 is in neutral or if the clutch 18 is not engaged, step 102 directs the algorithm to step 104.

Step 104 calculates a ratio of steering motor speed (from sensor 80) divided by the wheel speed (from sensor 76), and compares this ratio to a predetermined value, such as 10. If the ratio is not greater than 10, the algorithm is directed to exit via step 110. If the ratio is greater than 10, the algorithm is directed to step 106.

Step 106 compares the sensed wheel speed to a value equal to a fraction, 0.06 for example, of the engine speed. (The 0.06 factor used in step 106 depends on how fast the steering pump 40 turns relative to the engine speed, and the rotation speed of steering motor 42 relative to steering pump 40) If the wheel speed is not less than 0.06 times the engine speed, the algorithm is again directed to exit via step 110. If the wheel speed is less than 0.06 times the engine speed, the algorithm is directed to step 108.

Alternatively, if no engine speed signal is readily available, step 106' could be used instead of step 106. Step 106' compares the sensed wheel speed to a reference vehicle speed such as, for example, 6 kilometers per hour (km/h). If the wheel speed is not less than 6 km/h, the algorithm would be directed to exit via step 110. If the wheel speed is less than 6 km/h, the algorithm would be directed to step 108.

From either step 106 or 106', the algorithm would proceed to step 108 which multiplies by 0.98, for example, the absolute value of a count value which causes a small reduction in the speed of the steering motor 42, thereby reducing the velocity difference between the left and right track drive wheels 22 and 26, respectively. This subroutine is preferably executed 50 times per second. Thus, if the conditions tested in steps 102–106 remain true for one second, the count value and the steering motor speed would be reduced by almost two thirds.

It was determined that, for a tractor with a 2 meter tread, a self-perpetuating turn situation can exist only if the turn radius is well under 2 meters, and that a self-perpetuating turn situation can exist only if the conditions set forth in steps 102–106 are all met. Thus, when these conditions are all met, step 108 will gradually reduce the speed of the steering motor 42. This increases the commanded turn radius and prevents a self-perpetuating turn situation.

Figure 3:
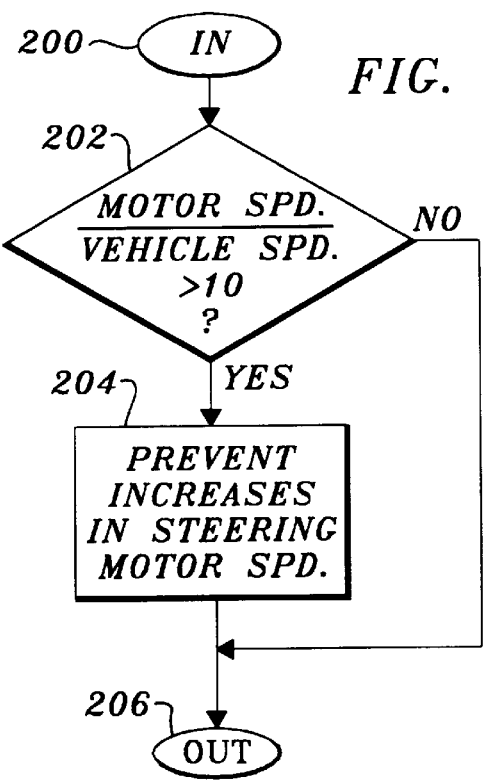
FIG. 3 is a logic flow diagram of an algorithm for an alternative embodiment of the invention.

Referring now to FIG. 3, an alternative embodiment will now be described wherein neither a transmission sensor nor a clutch sensor is utilized. This alternative subroutine begins at step 200. In step 202 the algorithm calculates a ratio of steering motor speed (from sensor 80) divided by the wheel speed (from sensor 76), and compares this ratio to a predetermined value, such as 10. If the ratio is not greater than 10, the algorithm is directed to exit via step 206. If the ratio is greater than 10, the algorithm is directed to step 204. Step 204 prevents increases of the speed of the steering motor 42, thereby preventing turn radii less than a certain amount and thereby preventing self-perpetuating turn situations.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A steering control system for a tracked vehicle having an engine which drives a transmission which is coupled to a differential track drive mechanism, the track drive mechanism having a steering motor which drives left and right tracks at a relative speed which is a function of the steering motor speed, an operator manipulated non-centered steering input member, the steering control system controlling the speed of the steering motor in response to manipulation of the steering input member, and comprising:

a motor speed sensor for sensing a speed of the steering motor;

a vehicle speed sensor for sensing vehicle speed;

a ratio value generator for generating a ratio value representing a ratio of the steering motor speed to the vehicle speed; and a speed limiter for preventing increases in steering motor speed if said ratio value is greater than a threshold.

2. A steering control system for a tracked vehicle having an engine which drives, via a clutch, a transmission which is coupled to a differential track drive mechanism, the track drive mechanism having a steering motor which drives left and right tracks at a relative speed which is a function of the steering motor speed, an operator manipulated non-centered steering input member, the control system controlling the speed of the steering motor in response to manipulation of the steering input member, and comprising:

a transmission sensor which senses when the transmission is in neutral;

a clutch sensor which senses the engagement status of the clutch;

a motor speed sensor for sensing a speed of the steering motor;

a vehicle speed sensor for sensing vehicle speed;

a ratio generator for generating a ratio value equal to the sensed steering motor speed divided by the sensed vehicle speed; and a speed reducer for reducing steering motor speed if the following conditions all occur a) the transmission is in neutral or the clutch is not engaged, b) the ratio value is greater than a threshold, and c) the vehicle speed is less than a certain reference level.

3. The steering control system of claim 2, wherein:

the reference level is a certain fraction of the engine speed.

4. A steering control system for a tracked vehicle having an engine which drives, via a clutch, a transmission which is coupled to a differential track drive mechanism, the track drive mechanism having a steering motor which drives left and right tracks at a relative speed which is a function of the steering motor speed, an operator manipulated non-centered steering input member, the steering control system controlling the speed of the steering motor in response to manipulation of the steering input member, and comprising:

a transmission sensor which senses when the transmission is in neutral;

a clutch sensor which senses the engagement status of the clutch;

a motor speed sensor for sensing a speed of the steering motor;

a vehicle speed sensor for sensing vehicle speed;

an engine speed sensor for sensing engine speed; and a speed reducer for reducing steering motor speed if the following conditions all occur a) the transmission is in neutral or the clutch is not engaged, b) a ratio of the steering motor speed divided by the vehicle speed is greater than a threshold, and c) the vehicle speed is less than a certain fraction of the engine speed.

5. A steering control system for a tracked vehicle having an engine which drives, via a clutch, a transmission which is coupled to a differential track drive mechanism, the track drive mechanism having a steering motor which drives left and right tracks at a relative speed which is a function of the steering motor speed, an operator manipulated non-centered steering input member, the control system controlling the speed of the steering motor in response to manipulation of the steering input member, and comprising:

a transmission sensor which senses when the transmission is in neutral;

a clutch sensor which senses the engagement status of the clutch;

a motor speed sensor for sensing a speed of the steering motor;

a vehicle speed sensor for sensing vehicle speed;

an engine speed sensor for sensing engine speed; and a ratio value generator for generating a ratio value representing a ratio of the steering motor speed to the vehicle speed to a threshold;

a ratio comparator for comparing the ratio value to a threshold value;

a speed comparator for comparing the vehicle speed to a reference level; and a speed reducer for reducing steering motor speed if the transmission is in neutral or the clutch is not engaged, and the ratio is greater than the threshold, and the vehicle speed is less than the reference level.

* * * * *